United States Patent [19]

Edwards

[11] 4,265,382
[45] May 5, 1981

[54] MULTI PURPOSE CARRIER FOR VEHICLE

[76] Inventor: Thomas M. Edwards, 6405 Smoke Rise Trail, Flint, Mich. 48507

[21] Appl. No.: 84,375

[22] Filed: Oct. 12, 1979

[51] Int. Cl.³ .............................................. B60R 19/02
[52] U.S. Cl. ..................... 224/320; 224/309
[58] Field of Search ............... 224/320, 321, 309, 310, 224/314, 329, 153, 210, 261

[56] References Cited

U.S. PATENT DOCUMENTS

| | | | |
|---|---|---|---|
| 2,573,187 | 10/1951 | Desilets | 224/310 X |
| 2,663,472 | 12/1953 | Belgau | 224/320 |
| 3,231,161 | 1/1966 | Calthorpe | 224/320 |
| 3,437,248 | 4/1969 | Allen | 224/309 X |
| 3,710,999 | 1/1973 | Allen | 224/321 X |
| 3,901,421 | 8/1975 | Kalicki et al. | 29/17 |
| 3,918,669 | 11/1975 | Osterhout | 248/206 R |
| 3,931,919 | 1/1976 | Gerber et al. | 211/22 |
| 4,182,467 | 1/1980 | Graber | 224/309 |

Primary Examiner—Steven M. Pollard

[57] ABSTRACT

A multi purpose carrier for vehicles is disclosed. The carrier of the present invention comprises a pair of opposed spaced apart telescoping end pieces having ends curving arcuately to meet a vehicle surface. A plurality of resilient end pieces snugly surround the ends and are interposed between the ends and the vehicle surface. A pair of telescoping spaced apart transverse members interconnect the end pieces to adjustably space the end pieces. The height, length, and width of the multi-purpose carrier is adjustable to accommodate varying vehicle surfaces and a variety of articles to be mounted thereon.

11 Claims, 7 Drawing Figures

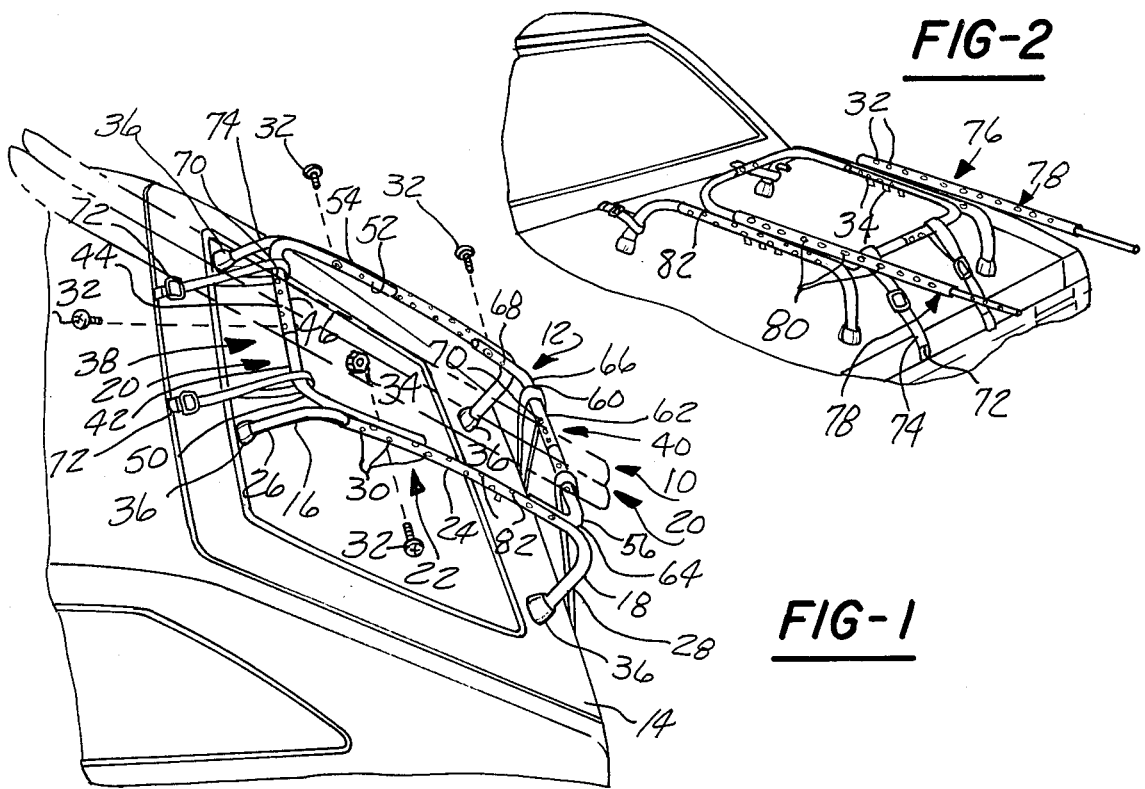
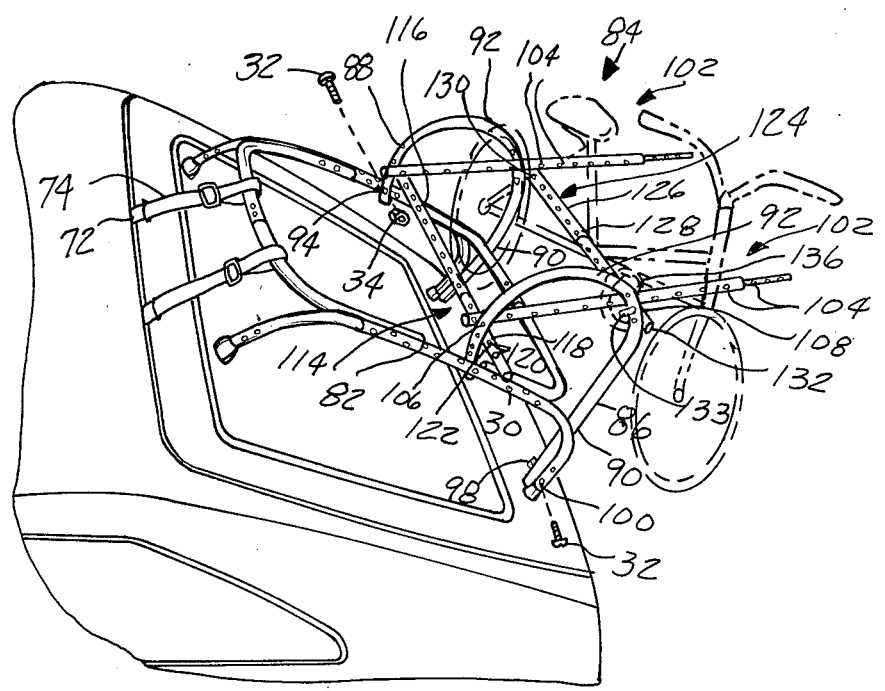

MULTI PURPOSE CARRIER FOR VEHICLE

BACKGROUND OF THE INVENTION

I. Field of the Invention

The present invention relates to the field of vehicle mounted article carriers, and more particularly the present invention relates to the field of detachably mounted multi purpose carriers for vehicles. Even more particularly, the present invention relates to the field of multi purpose carriers for vehicles which are adjustable to accommodate varying vehicle surfaces and are detachably mounted to the vehicle.

Description of The Prior Art

Carriers for luggage and the like which are detachably mounted to a vehicle surface are known. Special purpose carriers for transporting bicycles and other similar articles are also known which are detachably mounted to a vehicle surface.

U.S. Pat. No. 3,901,421 discloses a rack for transporting bicycles in an upright position. The rack of this invention is detachably mounted to the deck lid of a vehicle.

U.S. Pat. No. 3,918,669 discloses a car top carrier detachably mountable to the roof of a vehicle. This patent also discloses a universally swivelable suction cup which can be rotated to be attached vertically to an arcuate vehicle surface.

U.S. Pat. No. 3,931,919 discloses a bicycle carrier for automobiles that is releasably attached to the roof of a vehicle. The carrier of this invention is releasably attached to the drip rail of the vehicle.

None of the above listed Patents disclose the present invention comprising a pair of opposed spaced, telescoping end pieces with arcuate ends curved to meet the vehicle surface, the end pieces spaced apart by a pair of telescoping transverse members, the carrier being adjustable in height, length, and width to accommodate various articles to be carried.

The above listed United States Patents constitute the closest art relating to the present invention known to the Applicant and his Attorney.

SUMMARY OF THE INVENTION

The increasing popularity of smaller fuel efficient automobiles with reduced trunk space, creates a need for versatile luggage carriers. The luggage rack of the present invention is intended to fullfill that need.

The multi purpose carrier for vehicles of the present invention comprises a pair of opposed adjustable telescoping end members which include a front piece and a rear piece telescoped together at a telescoping straight portion. A front portion of the front piece curves downward in an arcuate manner at 90° to meet the vehicle surface, and a rear portion of the rear piece curves downward in an arcuate manner to meet the vehicle surface as well. A first plurality of evenly spaced transverse aligned apertures are formed through the straight portions and a fastening means such as a threaded fastener passing through one of the aligned apertures engages a nut to join the front and rear pieces together. A resilient sleeve snugly engages the ends of the front and rear pieces between the ends and the vehicle surface to prevent scratching.

A pair of opposed adjustable telescoping transverse members are employed to interconnect the end members in a spaced apart relationship.

A plurality of hooks engage the edges of the vehicle surface to which the carrier is mounted, and a plurality of straps and buckles are employed to extend between the hooks and the transverse members to secure the carrier to the vehicle surface.

The carrier of the present invention may be removably attached to vehicle roof, doors, rear deck, or hood to carry items such as building materials, luggage, skis, bicycles, boats, canoes, or the like. The carrier of the present invention is adjustable in both length and width to accommodate vehicle surfaces and vehicle mounted articles of varying size.

For a more complete understanding of the present invention, reference is made to the following detailed description and accompanying drawings.

BRIEF DESCRIPTION OF THE DRAWINGS

In the drawings, like reference numbers refer to like parts throughout the several views, and wherein:

FIG. 1 illustrates an embodiment of the present invention mounted to the deck of a "hatch-back" vehicle;

FIG. 2 illustrates an embodiment of the present invention adapted as a bicycle carrier affixed to the trunk lid of a vehicle;

FIG. 3 illustrates the device of FIG. 1 adapted to carrying luggage and bicycles;

DESCRIPTION OF THE PREFERRED EMBODIMENT

Figure 4:
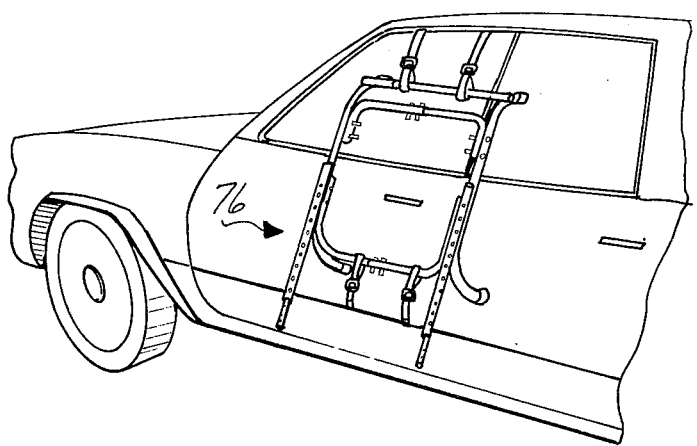
FIG. 4 illustrates the device of FIG. 2 mounted to the side of a vehicle.

Referring now to the drawings and in particular to FIG. 1 wherein there is illustrated at 10 a carrier 12 of the present invention mounted to a vehicle surface 14 comprising a pair of opposed spaced apart telescoping end pieces or members 16,18 with the ends thereof curving arcuately to meet the vehicle surface 14. A means 20 is provided for selectively adjusting the width of the end pieces 16,18 and a means 22 is provided for selectively adjusting the length of the end pieces.

The pair of opposed adjustable telescoping end members comprise the front piece 16 and the rear piece 18 telescoped together at a straight portion 24. A front portion 26 of the front piece curves downward in an arcuate manner to meet the vehicle surface 14, and a rear portion 28 of the rear piece 18 curves downward in an arcuate manner to meet the vehicle surface.

A first plurality of evenly spaced transversely oriented aligned apertures 30 are formed through the straight portions, of the front and rear pieces 16,18 and one of a plurality of fastening means such as threaded fasteners 32 passes through one of the aligned first transverse apertures in the front and rear pieces 16,18 and one of a plurality of nuts 34 threadingly engages the fastener to fasten the front and rear pieces together. A plurality of suction cups or resilient sleeves 36 snugly engage an end of the front and rear portions 26,28 between the ends thereof and the vehicle surface 14 to prevent scratching.

The means 20 for adjusting the width of the end members 16,18 comprises a pair of opposed adjustable telescoping transverse members 38,40. The front transverse member 38 includes a first piece 42 and a second piece 44 telescoped together at a telescoped straight portion 46. Curved ends 50 and 52 of the first and second transverse members 38,40 are curved rearward in an arcuate manner to abut the end members 16,18. A first pair of transverse apertures 54 are formed in each abutting end aligned with the first transverse apertures 30 and a pair of threaded fasteners 32 engage each pair of the aligned apertures and a nut 34 engages each threaded fastener to join the ends of the front transverse members 38,40 to the end members 16,18.

The rear transverse member 40 includes a third piece 56 and a fourth piece 60 telescoped together at a second straight telescoped portion 62. Curved ends 64,66 of the third and fourth pieces curve forward in an arcuate manner to abut the end members 16,18 and a second pair of transversely oriented apertures 68 formed in each abutting end are aligned with the first transverse apertures 30 and a pair of the threaded fasteners 32 engage each pair of aligned apertures with one of the nuts 34 threadingly engaging each threaded fastener to join the curved ends of the rear transverse member 40 to the end members 16,18.

A plurality of spaced longitudinally oriented apertures 70 are formed through the telescoped portions 46,62 of the front and rear transverse members and one of the threaded fasteners 32 engages the aligned longitudinal apertures 70 in each of the front and rear transverse members and one of the nuts 34 threadingly engages the threaded end of each fastener to secure the telescoped portions together.

A plurality of hooks 72 engage the edges of the vehicle surface 14, and a plurality of buckled straps 74 extend between the carrier 12 and the hooks 72 to fasten the luggage carrier 12 to the vehicle surface 14.

Referring now to FIG. 2 wherein there is illustrated at 76 another embodiment of the present invention wherein the carrier is converted to a device for supporting bicycles. In the bicycle carrier embodiment 76, the carrier 12 has added thereto a pair of rearward extending telescoping tubes 78 which include a first plurality of vertically oriented evenly spaced apertures 80 distributed along the length thereof. A second plurality of vertically oriented evenly spaced apertures 82 are formed along the end members 16,18 aligned with the first plurality of vertical apertures 80 and are positioned between the first plurality of transverse apertures 30. A pair of the threaded fasteners 32 engage a forward pair of aligned apertures in each rearward extending tube 78 and end member and a nut 34 threadingly engages each threaded fastener to affix the tubes to the end members. To utilize the bicycle carrier 76 the telescoping tubes 78 are extended to a desired length to mount a bicycle, and a pair of the second vertical apertures 80 are aligned to receive one of the threaded fasteners 32 which passes through both of the telescoping tubes 78 and one of the nuts 34 threadingly engages each of the fasteners to secure the telescoping tubes at the desired length. The bicycle frame is mounted over the telescoping tubes and is supported thereby. Elastic lines (not shown) are employed to secure the bicycle to the carrier 76 by threading around the tubes 78 of the carrier and the bicycle frame.

Referring again to the drawings, and in particular to FIG. 3 wherein there is illustrated at 84 a carrier for supporting both bicycles and luggage. The carrier 84 is adapted from the carrier 12 of FIG. 1. The carrier 84 comprises a pair of opposed side members 86,88 including a vertical leg 90 extending vertically above the end member from a lower end of the rear piece. A side member upper portion 92 curves forward in an arcuate manner, the arc continuing and extending downward terminating proximate one of the first transverse apertures 30. A first end aperture 94 in the upper end of the arcuate is aligned with one of the first transverse apertures 30. A second transverse aperture 100 is formed transversely in the lower end of the rear piece and is aligned with a third transverse aperture 98 formed in a lower end of the vertical leg. One of the threaded fasteners 32 engages each of the first end apertures 94 and the second end apertures 98 and their respective aligned apertures, 30 and 100 in the end pieces and a pair of nuts 34 engage each threaded fastener to secure the side members to the end pieces. A pair of opposed rearward and upward extending telescoping tubes 102 abut the side members and a second plurality of evenly spaced transversely oriented apertures 104 are spaced along the opposed rearward extending tubes 102. A second pair of apertures 106,108 in each side member 86,88 are aligned with one of the apertures 104. A pair of threaded fasteners 32 engage the aligned apertures 104,106,108 and one of the nuts 34 threadingly engages each fastener to affix the rearward and upward extending telescoping tubes 102 to the side members 86,88. A first transverse telescoping tube 114 comprises a first outer tube 116 and a first inner tube 118 telescopingly engaged. A first plurality of evenly spaced crossing apertures 120 are disposed along the length of the first inner and outer tubes 116,118. The end most aperture 122 of the cross apertures 120 in the first inner tube is aligned with one of the first vertical apertures 82 in each of the end members and one of the threaded fasteners 32 engages each of the aligned apertures with a nut threadingly engaging the threaded end of the fastener to affix the first inner tube 116 and the first outer tube 118 to the opposed end members. The length of the first transverse tube 114 is adjusted by telescopingly adjusting the inner and outer tubes 116,118 to the desired length and securing the tubes in place by means of a threaded fastener 32 which extends through aligned apertures 120 in the tubes 116,118 and which is engaged by a nut 34.

A second transverse telescoping tube 124 extends between side members 86,88 and includes a second outer tube 126 and a second inner tube 128 telescoped together. A second plurality of spaced crossing apertures 130 are spaced along the second inner and outer tubes 128,126 and end apertures of the second outer tube 126 and the second inner tube 128 are aligned with a corresponding pair of longitudinal apertures 133 formed in the side members 86,88. A pair of the threaded fasteners 32 engage the aligned apertures and a pair of nuts threadingly engages the fasteners to affix the second inner and outer tubes to the side members. One of the second cross apertures 130 in the second outer tube is aligned with one of the second cross apertures 130 in the second inner tube and one of the threaded fasteners 32 engages the aligned apertures with a nut threadingly engaging the fastener to affix the second outer tube 126 to the second inner tube 128. Means 136 are provided for strapping bicycles and luggage to the carrier 84 which comprises elastic straps with hooks for engaging apertures formed in the carrier 84.

Referring again to the drawing, and in particular to FIG. 4 wherein there is illustrated the carrier 76 affixed to the side of a vehicle. The carrier 76 as utilized in FIG. 4 can be employed to carry large objects such as building materials or skis the side of the vehicle.

Figure 5:
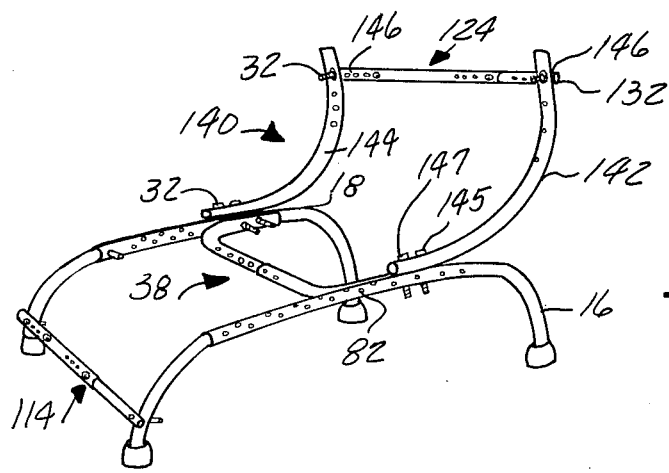
FIG. 5 illustrates an embodiment of the present invention adapted for carrying skis.

Referring now to FIG. 5 of the drawings, there is illustrated a rear deck ski carrier 140. The rear deck ski carrier 10 utilizes the pair of opposed telescoping end members 16,18 spaced apart by the telescoping transverse member 38 and the telescoping transverse tube 114. A pair of arcuate tubes 142,144 are formed in an arcuate manner with a pair of apertures 145,147 formed in their lower ends to align with the first plurality of vertical spaced apart apertures 82 in the end members 16,18 and are bolted to the end members by one of the threaded fasteners 32 passing through each of the aligned apertures and a nut 34 engaging the threaded end of the threaded fasteners. The second transverse telescoping tube 124 extends between an upper end of the arcuate tubes 142,144 and the end apertures 132 in the tube 124 align with an aperture 146 formed in the end of the tubes 142,144 and a pair of threaded fasteners 32 pass through the end apertures and the apertures 146 with a pair of nuts threadingly engaging the threaded apertures to secure the telescoping tubes 124 to the upper portion of the arcuate tubes 142,144. Several pairs of skis may be extended between the telescoping tubes 114,124 and laced thereto using elastic straps. The carrier 140 is secured to a deck lid of a vehicle by the use of the hooks 72 and buckle straps 74 (not shown).

Figure 6:
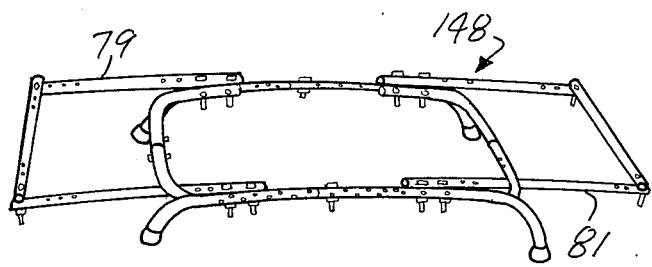
FIG. 6 illustrates the present invention adapted to a car top carrier for carrying long objects such as ladders.

Referring now to FIG. 6 of the drawing wherein there is illustrated at 148 the elements of the carrier 76 of FIG. 2 rearranged to form an elongated car top carrier for long objects such as ladders, pipes, boards, skis, canoes, and boats. In the carrier 148 the rearward extending telescoping tubes 78 have the inner tube 81 removed and affixed to a forward end of the carrier extending forward. The plurality of vertical apertures 80 of the tubes 78,81 are aligned with the vertical apertures 82 formed in the end members 16,18 and the threaded fasteners 32 and nuts 34 are employed to affix the tubes 78,81 to the end members. The first telescoping transverse tube 114 and the second telescoping transverse tube 124 are affixed to the ends of the tubes 78 and 81 by a plurality of the threaded fasteners 32 passing through the end apertures formed in the telescoping tubes 114,124 aligned with the vertical apertures formed in the tubes 78,81 with a plurality of the nuts 34 engaging the threaded apertures 32 to affix the telescoping tubes 114,124 to the tubes 78,81.

Figure 7:
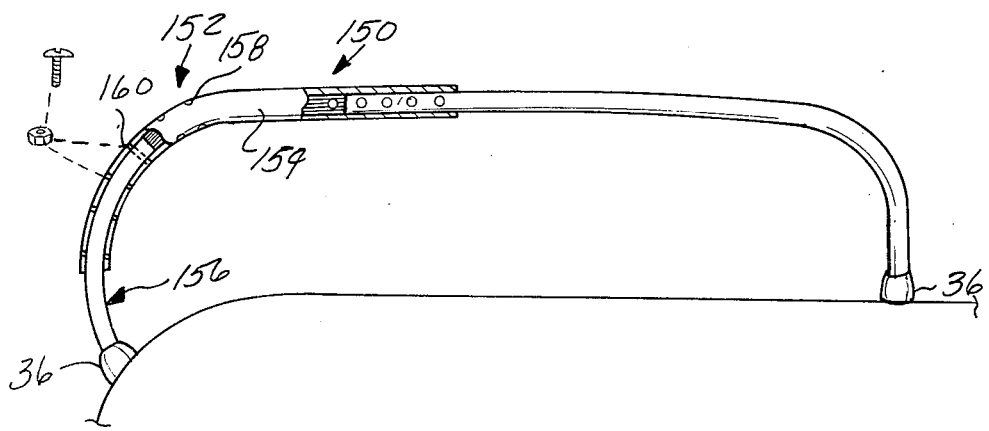
FIG. 7 illustrates a variable length arcuate element for adapting the carrier of the present invention to sloping, curving, or various sized vehicle surfaces.

Referring again to the drawing and in particular to FIG. 7 wherein there is illustrated at 150 a variable length arcuate element 152 comprising an outer arcuate member 154 of constant radius formed from a tube. An inner arcuate member 156 having a radius similar to that of the outer arcuate member 154 telescopingly engages the outer arcuate member. A plurality of evenly spaced apertures 158 formed in the outer arcuate member 154 are selectively aligned with an aperture 160 formed in an end of the inner arcuate member 156. The threaded fastener 32 passes through the selectively aligned apertures 158,160 to fasten the inner and outer arcute members 154 and 156 in a fixed relationship. By sliding the inner arcuate member 156 within the outer arcuate member 154 an adjustment and variation in the length of the arcuate members and the angle of the arcuate members is readily obtained. The resilient sleeve 36 snugly engages a lower end of the arcuate member 156 and is interposed between the arcuate member 156 and the vehicle surface to prevent scratching.

It is obvious to the skilled artisan that the various parts described hereinabove may be assembled in a variety of ways to accommodate a variety of articles to be carried. The scope of the present invention is not limited to the example described hereinabove. The criticality of the present invention lies in the adjustable length and width of the carrier having telescoping tubes with arcuate ends curving to meet the vehicle surface and the ability to assemble the elements of the carrier in a variety of ways to accommodate various vehicle surfaces and articles to be carried.

Having thus described my invention what I claim is:

1. A multi-purpose carrier for vehicles comprising:
a pair of opposed spaced apart telescoping end pieces spaced above the vehicle with ends meeting a vehicle surface, the telescoping end pieces being extensible and retractable to adjust the length of said carrier;
a pair of opposed spaced apart telescoping transverse members being spaced above the vehicle surface and extending between end pieces, the telescoping transverse members extensible and retractable to selectively adjust the spacing of the end pieces.

2. A multi-purpose carrier for vehicles comprising:
a pair of opposed spaced apart adjustable telescoping end pieces comprising a front piece and a rear piece telescoped together at a straight portion, a front portion of the front piece curving downward in an accurate manner to meet the vehicle surface, a rear portion of the rear piece curving downward in an arcuate manner to meet the vehicle surface, a first plurality of evenly spaced transversely oriented aligned apertures through the straight portions, a fastening means to fasten the front and rear pieces together;
a resilient sleeve snugly engaging an end of the front and rear portions interposing the end and the vehicle surface;
a pair of opposed adjustable telescoping transverse members comprising a front transverse member including a first piece and a second piece telescoped together at a first straight telescoped portion, curved ends of the first and second pieces curing rearward in an arcuate manner to abut the end members, a first pair of transversely oriented apertures formed in each abutting end aligned with the fastening means to join the end of the front transverse member to the end members, a rear transverse member including a thrid piece and a fourth piece telescoped together at a second straight telescoped portion, curved ends of the third and fourth pieces curving forward in an arcuate manner to abut the end members, a second pair of transversely oriented apertures formed in each abutting end aligned with the first transverse apertures, a fastening means to join the curved ends of the rear transverse member to the end members, a plurality of spaced longitudinal apertures through the telescoped portions of the front and rear transverse members, a fastening means to secure the telescoped portions together;
a means for detachably securing the carrier to the vehicle surface;
means for selectively spacing the end pieces; and
Means for selectively adjusting the length of the end pieces.

3. The multi-purpose carrier as defined in Claim 2 further comprising:

a pair of rearward extending telescoping tubes including a first plurality of vertical evenly spaced apertures distributed along the length thereof;

a second plurality of vertical evenly spaced apertures formed along the end members aligned with the first plurality of vertical apertures and positioned between the first and second transverse apertures, a pair of threaded fasteners engaging a forward pair of aligned apertures in each rearward extending tube, a pair of nuts threadingly engaging each fastener to affix the tubes to the end members;

the telescoping tubes extended to a desired length to mount a bicycle, a pair of the second vertical apertures aligned to receive a threaded fastener, a nut threadingly engaging the fastener to secure the telescoping tubes at the desired length;

means for securing a bicycle to the telescoping tubes; and wherein the carrier defines a means for securing bicycles to a vehicle.

4. The multi-purpose carrier as defined in claim 2 further comprising:

a pair of opposed side members comprising a vertical leg extending upward from a lower end of the rear piece extending above the end members, a side member upper portion curving forward in an arcuate manner, the arcuate continuing and extending downward terminating at an upper end at a first transverse aperture, a first end aperture in the upper end aligned with the first transverse aperture, a second end aperture formed transversely in the lower end of the rear piece aligned with a transverse aperture formed in a lower end of the vertical leg, a pair of threaded fasteners engaging each of the first end apertures and second end apertures and their respective aligned apertures a nut to engage each threaded fastener;

a pair of opposed rearward and upward extending telescoping tubes abutting the side members, a second plurality of evenly spaced transverse apertures along the opposed rearward extending tubes, a second pair of apertures in each opposed tube aligned with the side members, a third pair of transverse apertures formed in each side member aligned with the second pair of apertures, a pair of threaded fasteners engaging the aligned apertures and a nut threadingly engaging each fastener to affix the rearward and upward extending telescoping tubes to the side members;

a first telescoping transverse tube comprising a first outer tube and a first inner tube telescopingly engaged, a first plurality of evenly spaced cross apertures along the first inner and outer tubes, an end aperture of the first inner tube aligned with one of the first vertical apertures, a threaded fastener engaging the apertures a nut threadingly engaging the fastener to affix the first inner tube to a first opposed end member, an end aperture of the first outer tube aligned with one of the first vertical apertures in a second of the opposed end members, a threaded fastener engaging the aligned apertures a nut threadingly engaging the fastener to affix the first outer tube to the second end member, one of the first cross apertures in the first outer tube aligned with one of the first cross apertures in the first inner tube, a threaded fastener engaging the aligned first cross apertures a nut threadingly engaging the fastener to affix the first outer tube to the first inner tube;

a second transverse telescoping tube comprising a second outer tube and a second inner tube telescopingly engaged, a second plurality of evenly spaced cross apertures along the second inner and outer tubes, an end aperture of the second outer tube and the second inner tube aligned with a corresponding pair of longitudinal apertures formed in the side members proximate the opposed rearward extending tubes, a pair of threaded fasteners engaging the aligned apertures a pair of nuts threadingly engaging the fasteners to affix the second inner and outer tubes to the side members, one of the second cross apertures in the second outer tube aligned with one of the second cross apertures in the second inner tube, a threaded fastener engaging the aligned apertures a nut threadingly engaging the fastener to affix the second outer tube to the second inner tube;

means for strapping bicycles and luggage to the carrier; and wherein the carrier defines a means for securing bicycles and luggage to a vehicle.

5. The multi-purpose carrier as defined in claim 1 further including a luggage support comprising;

a pair of upward extending side members supported by the end pieces, including an arcuate upper portion having an arc forming a half circle continuing and returning downward to said end piece.

6. The multi-purpose carrier as defined in claim 5 further including a bicycle support comprising;

a pair of rearward and upward extending telescoping tubes spaced apart, abutting and attached to the upward extending side members, and means for adjustably varying the telescoping tubes length.

7. The multi-purpose carrier as defined in claim 1, wherein each end piece comprises:

a first piece and a second piece telescoped together at a straight section, and interconnected to the end pieces.

8. The multi-purpose carrier as defined in claim 7, wherein:

the first piece and the second piece curve toward the end pieces in an arcuate manner abutting the end pieces, a pair of spaced apart apertures formed in an end of said first piece and said second piece, each pair of spaced apart apertures aligned with a corresponding pair of apertures in the end pieces, and fastening means engaging the aligned apertures to secure the first and second pieces to the end piece.

9. The multi-purpose carrier as defined in claim 1, wherein the end pieces comprise:

a front piece and a rear piece telescoped together at a straight portion; and the front piece and the rear piece being extensible or retractable to adjust the length of the end piece.

10. The multi-purpose carrier as defined in claim 1, wherein the spacing between the carrier and the vehicle is adjustable.

11. The multi-purpose carrier as defined in claim 1 further comprising a resilient sleeve snugly engaging the ends of the end pieces where they meet the vehicle surface to prevent damage to the surface.

* * * * *

UNITED STATES PATENT AND TRADEMARK OFFICE
CERTIFICATE OF CORRECTION

PATENT NO. : 4,265,382

DATED : May 5, 1981

INVENTOR(S) : Thomas M. Edwards

It is certified that error appears in the above-identified patent and that said Letters Patent are hereby corrected as shown below:

In the drawing, Sheet 2, Figure 6, the reference numeral 79 should be 78, and the reference numerals 114 and 124 should be applied depicting the first and second telescoping transverse tubes which are affixed to the ends of the tubes 78 and 81, respectively. (See Attached sheet)

Column 6, line 29, preceding "manner" the correct spelling of "accurate" is --arcuate--.

Column 6, line 37, following "portion" delete "interposing" and insert --interposed between--.

Column 6, line 45, following "end" delete "member" and insert --pieces--.

Column 6, line 46, following "with" insert --one of the first transverse apertures,--.

Column 6, line 47, preceding "of" the correct spelling of "end" is --ends--.

UNITED STATES PATENT AND TRADEMARK OFFICE
CERTIFICATE OF CORRECTION

PATENT NO. : 4,265,382
DATED : May 5, 1981
INVENTOR(S) : Thomas M. Edwards

It is certified that error appears in the above-identified patent and that said Letters Patent are hereby corrected as shown below:

Column 6, line 48, following "end" delete "members" and insert --pieces--.

Column 6, line 53, following "end" delete "members" and insert --pieces--.

Column 6, line 55, following "with" insert --one of--.

Column 6, line 57, following "end" delete "members" and insert --pieces--.

Column 6, line 60, following "means" insert --adapted to extend through aligned ones of the longitudinal apertures--.

Column 6, line 65, preceding "for" delete "Means" and insert --means--.

Column 7, line 5, following "end" delete "members" and insert --pieces--.

Column 7, line 10, following "tube" insert --and end pieces--.

Column 7, line 11, following "end" delete "member" and insert --pieces--.

UNITED STATES PATENT AND TRADEMARK OFFICE
CERTIFICATE OF CORRECTION

PATENT NO. : 4,265,382
DATED : May 5, 1981
INVENTOR(S) : Thomas M. Edwards

It is certified that error appears in the above-identified patent and that said Letters Patent are hereby corrected as shown below:

Column 7, line 14, preceding "aligned" insert --formed in the telescoping tubes--.

Column 7, line 25, following "end" delete "members" and insert --pieces--.

Column 7, line 29, following "aperture" insert --on the end piece--.

Column 7, line 35, following "apertures" insert --in the end pieces--.

Column 7, line 55, following "apertures" insert --in the end pieces--.

Column 7, line 56, following "apertures" insert --and--.

Column 7, line 58, following the first occurrence of "end" delete "member" and insert --piece--.

Column 7, line 63, following "end" delete "member" and insert --piece--.

Column 7, line 67, following "apertures" insert --and--.

UNITED STATES PATENT AND TRADEMARK OFFICE
CERTIFICATE OF CORRECTION

PATENT NO. : 4,265,382
DATED : May 5, 1981
INVENTOR(S) : Thomas M. Edwards

It is certified that error appears in the above-identified patent and that said Letters Patent are hereby corrected as shown below:

Column 8, line 12, following "apertures" insert --and--.

Column 8, line 15, following "tube" insert --being--.

Column 8, line 18, preceding "a" insert --and--.

UNITED STATES PATENT AND TRADEMARK OFFICE
CERTIFICATE OF CORRECTION

PATENT NO. : 4,265,382

DATED : May 5, 1981

INVENTOR(S) : Thomas M. Edwards

It is certified that error appears in the above—identified patent and that said Letters Patent is hereby corrected as shown below:

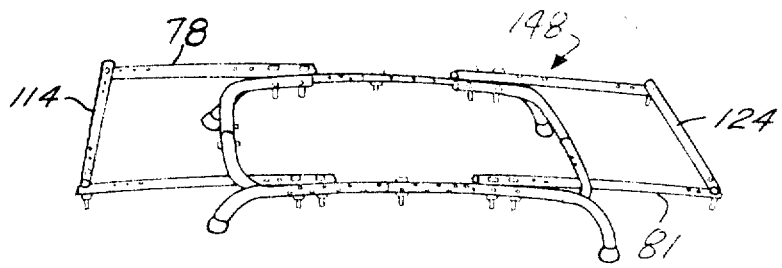

FIG-6

Signed and Sealed this

Twenty-ninth Day of September 1981

[SEAL]

Attest:

Attesting Officer

GERALD J. MOSSINGHOFF

Commissioner of Patents and Trademarks